United States Patent
Viora

(10) Patent No.: US 10,618,180 B2
(45) Date of Patent: Apr. 14, 2020

(54) GRIPPING DEVICE, AND APPARATUS FOR LOADING/UNLOADING SLAB MATERIALS COMPRISING SAID DEVICE

(71) Applicant: ALL4ONE S.R.L., Sciolze (TO) (IT)

(72) Inventor: Giovanni Viora, Sciolze (IT)

(73) Assignee: All4one S.R.L., Sciolze (TO) (IT)

( * ) Notice: Subject to any disclaimer, the term of this patent is extended or adjusted under 35 U.S.C. 154(b) by 124 days.

(21) Appl. No.: 15/934,585

(22) Filed: Mar. 23, 2018

(65) Prior Publication Data

US 2018/0272542 A1    Sep. 27, 2018

(30) Foreign Application Priority Data

Mar. 24, 2017   (EP) ................................. 17425036

(51) Int. Cl.
*B25J 15/02* (2006.01)
*B25J 9/10* (2006.01)
(Continued)

(52) U.S. Cl.
CPC .......... *B25J 15/0028* (2013.01); *B21D 43/11* (2013.01); *B21D 43/28* (2013.01); *B25J 9/0084* (2013.01);
(Continued)

(58) Field of Classification Search
CPC .. B25J 15/0028; B25J 15/022; B25J 15/0266; B25J 9/026; B25J 9/1065; B25J 9/0084; B25J 15/0213; B21D 43/11
(Continued)

(56) References Cited

U.S. PATENT DOCUMENTS 4,303,269 A * 12/1981 Faughnan .................. B66C 1/32
                                                    294/106
4,595,333 A *  6/1986 Ono ....................... B25J 19/063
                                                    294/106
(Continued)

FOREIGN PATENT DOCUMENTS

DE   40 16 033 A1   11/1991
EP   0 658 404 A1   6/1995
(Continued)

OTHER PUBLICATIONS

European Search Report dated Sep. 26, 2017, issued in European Application No. 17425036, filed Mar. 24, 2017.
(Continued)

*Primary Examiner* — Dean J Kramer
(74) *Attorney, Agent, or Firm* — Workman Nydegger

(57) ABSTRACT

A gripping device, in particular for loading/unloading apparatuses, includes: a main body; at least one first and a second articulated structure; at least one first and a second gripping head, respectively mounted on the first and second articulated; a first motorised member, mounted on the main body and active on the first articulated structure to modify the position of the first gripping head with respect to the main body; a second motorised member, mounted on the main body and active on the second articulated structure to modify the position of the second gripping head with respect to the main body. Each of the first the second articulated structures has: a first arm hinged to the main body; a second arm hinged to the main body; a rod, hinged to the first arm and to the second arm.

12 Claims, 10 Drawing Sheets

(51) Int. Cl.
*B21D 43/11* (2006.01)
*B25J 15/00* (2006.01)
*B21D 43/28* (2006.01)
*B25J 9/02* (2006.01)
*B25J 9/00* (2006.01)

(52) U.S. Cl.
CPC ............ *B25J 9/026* (2013.01); *B25J 9/1065* (2013.01); *B25J 15/0213* (2013.01)

(58) Field of Classification Search
USPC .......................................... 294/106; 414/917
See application file for complete search history.

(56) References Cited

U.S. PATENT DOCUMENTS

| | | | | |
|---|---|---|---|---|
| 4,784,562 A * | 11/1988 | Kishi | ................... | B21D 43/105 100/215 |
| 4,975,016 A * | 12/1990 | Pellenc | ................... | A01D 46/24 414/501 |
| 5,151,008 A * | 9/1992 | Ishida | ................... | B25J 9/0084 414/744.5 |
| 5,667,354 A * | 9/1997 | Nakazawa | ............. | B25J 9/0084 414/744.5 |
| 8,317,453 B2 * | 11/2012 | Givens | ....................... | B25J 5/04 248/325 |
| 2011/0241369 A1 * | 10/2011 | Kamon | ................... | B25J 9/102 294/213 |
| 2017/0057096 A1 | 3/2017 | Saadat | | |

FOREIGN PATENT DOCUMENTS

| | | |
|---|---|---|
| EP | 0 667 213 A1 | 8/1995 |
| WO | 99/23021 | 5/1999 |
| WO | 2008/139409 A2 | 11/2008 |

OTHER PUBLICATIONS

Extended European Search Report dated Oct. 10, 2017, issued in European Application No. 17425036, filed Mar. 24, 2017.

* cited by examiner

GRIPPING DEVICE, AND APPARATUS FOR LOADING/UNLOADING SLAB MATERIALS COMPRISING SAID DEVICE

CROSS-REFERENCE TO RELATED APPLICATIONS

This application claims priority to European Application No. 17425036.5, filed Mar. 24, 2017, which is incorporated herein by specific reference.

DESCRIPTION

Technical Field

The object of the present invention is a gripping device, in particular for loading/unloading apparatuses.

The invention has advantageous application in the field of apparatuses adapted for loading/unloading slabs, for example of metallic material, slaved to automatic cutting stations.

Prior Art

As known, technologies for automatically cutting materials in the form of flat sheets, like for example some metallic materials, composite materials, plastics, glass, leathers, etc. . . . are currently available Such technologies are based on the use of lasers, plasma, oxycutting, water-jet, punching, blade, wire, etc. . . . . .

Before the cutting operations it is necessary to position the sheet in a position in which it can then be subjected to the action of the cutting machinery. Once the cutting operation has ended, it is necessary to remove both the pieces of interest, and the so-called "skeleton", i.e., the part of sheet outside of the part of actual interest. In particular, the pieces of interest are grouped according to predetermined logics of organisation, categorisation and identification.

The loading/unloading activities can currently be carried out both manually and through the use of automated structures.

For example, it is known to use Cartesian lifting systems, equipped with suitably configured gripping tools and heads, suitable for gripping the sheets or the pieces and for moving them according to what is foreseen.

International patent application WO 2008/139409 A2 describes one of such systems.

The gripping heads can be associated with magnetic, electromagnetic or suction cup-type tools, suitable for reliably engaging with the sheets and with the pieces to be moved.

The Applicant has noted that the systems provided by the state of the art have different drawbacks.

For example, the system described in the aforementioned international patent application has a complex and expensive structure, which is difficult for medium-small firms to adopt.

Other known systems, which foresee the use of an anthropomorphic robot, are unable to precisely and reliably load the sheet and are limited to unloading pieces that are not too heavy and small in size. Otherwise, long pieces, or in any case those of larger size, tend to bend and catch on the disposal grid, deforming it, creating difficulties for continuing the operation.

PURPOSES AND SUMMARY OF THE INVENTION

The purpose of the present invention is therefore to provide a gripping device that makes it possible to simplify the structure of the loading/unloading apparatuses of slab materials.

A further purpose of the finding is to provide a gripping device that is capable of operating effectively and reliably on pieces/sheets even of very different size to each other.

These and other purposes are substantially accomplished by a gripping device, as well as by a loading/unloading apparatus comprising said gripping device, according to what is described in the attached claims.

BRIEF DESCRIPTION OF THE DRAWINGS

Further characteristics and advantages will become clearer from the detailed description of preferred but not limiting embodiments of the invention.

Such a description is provided hereinafter with reference to the attached figures, also having a purely exemplifying and therefore not limiting purpose, wherein.

DETAILED DESCRIPTION OF THE INVENTION

Figure 1:
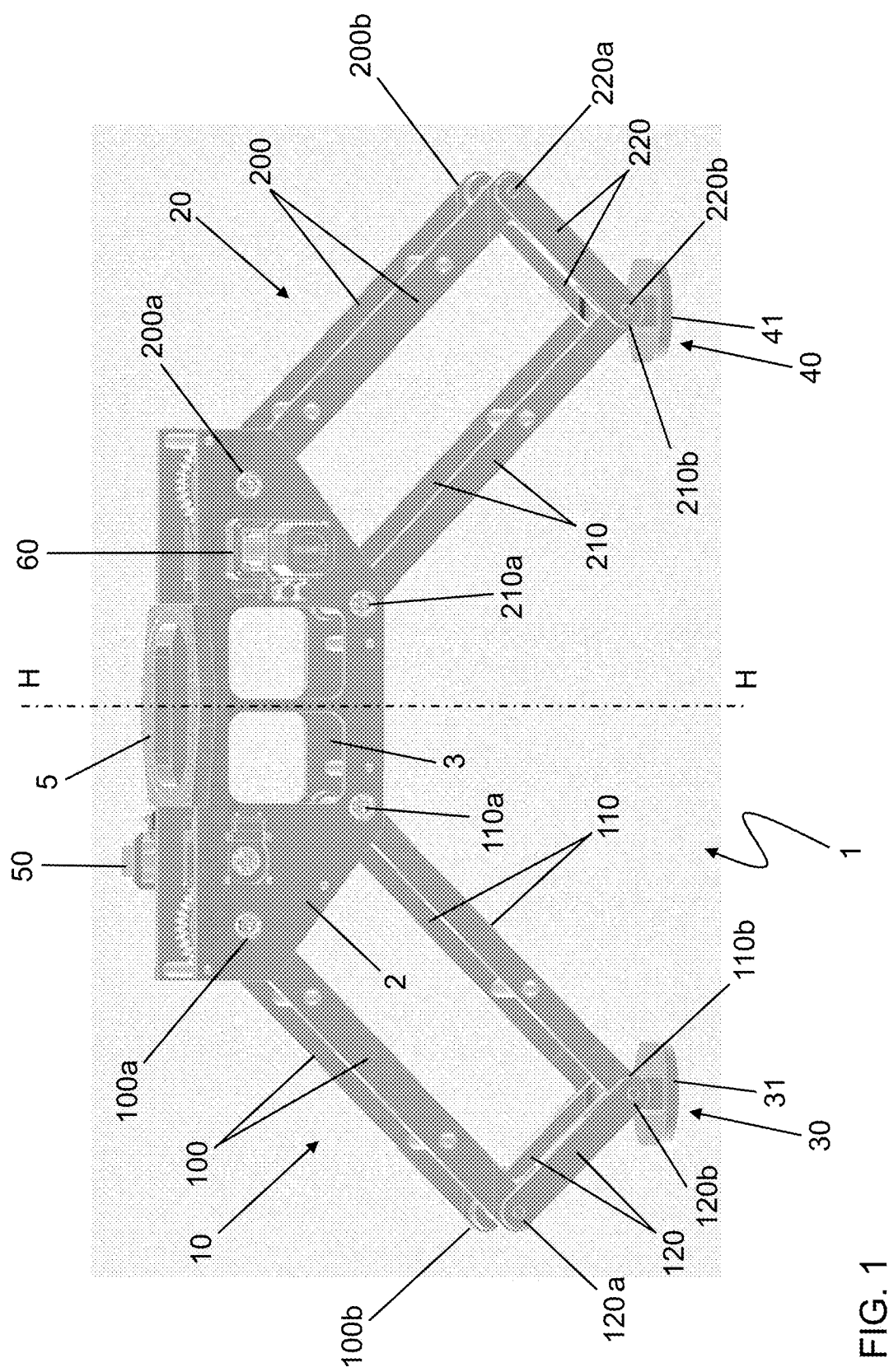
FIG. 1 shows a front perspective view of a first embodiment of a gripping device in accordance with the present invention.

In accordance with the attached figures, reference numeral 1 wholly indicates a gripping device in accordance with the present invention.

Figure 2:
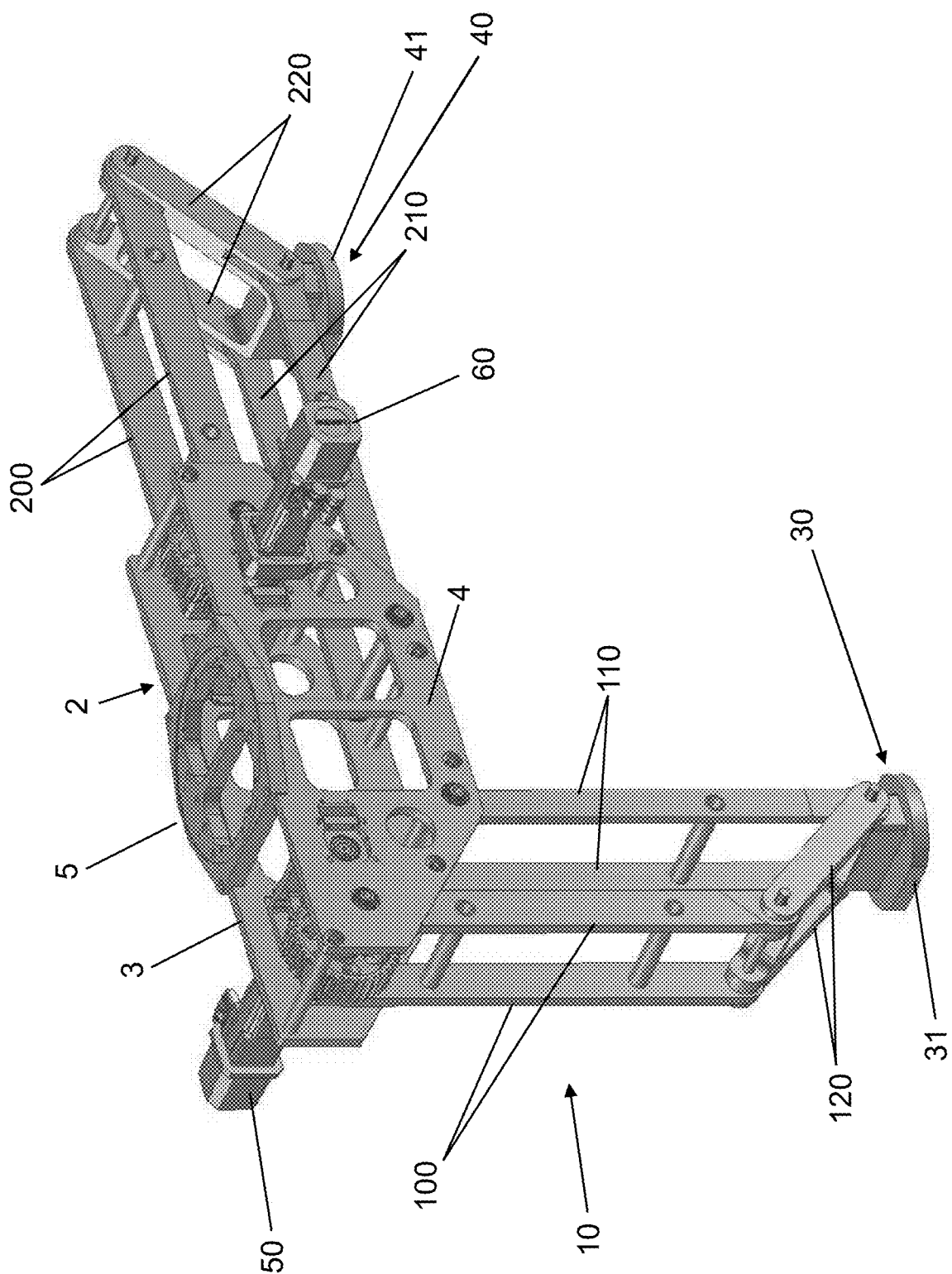
FIG. 2 shows the device of FIG. 1, in a different operative configuration and from a different angle.

The device 1 firstly comprises a main body 2. The main body 2 can comprise two shaped plates 3, 4 facing one another, as schematically shown in FIGS. 1-2. The plates 3, 4 can be fixed to one another through a plurality of pins.

It should be noted that the main body 2 can also have a different structure, provided that it is suitable for supporting the various elements that will be described hereinafter, and for ensuring an effective constraint with the moving structure 320 (which will be described hereinafter), adapted for moving the device 1.

The device 1 also comprises a first and a second articulated structure 10, 20.

The first and the second articulated structures 10, 20 preferably have substantially the same structure as each other.

Preferably, the first and the second articulated structures 10, 20 have a substantially symmetrical configuration with respect to a middle plane of the device 1 and/or a middle plane of the main body 2. For example, such a middle plane can be substantially a vertical plane, represented by the line H-H in FIG. 1, substantially perpendicular to the aforementioned shaped plates 3, 4.

The first and the second articulated structures 10, 20 have the task of supporting respective gripping heads. In particular, the first articulated structure 10 supports a first gripping head 30, and the second articulated structure 20 supports a second gripping head 40.

The gripping heads 30, 40 are structured so as to allow the attachment of gripping tools that, in turn, can be of the magnetic, electromagnetic or suction cup type. It is also foreseen for the gripping heads 30, 40 to be suitable for supporting tools of a different kind, so as to be able to be replaced according to requirements. For this purpose, the apparatus 300 (in which the device 1 can be used and which will be described hereinafter) can be equipped with a suitable tool replacement station, in which a plurality of gripping heads, even different from one another, are housed.

Preferably, the gripping heads 30, 40 can have a substantially plate-like configuration, for example made from aluminium.

The gripping heads 30, 40 can advantageously allow the aligned attachment of the gripping tools.

As well as the aforementioned suction cup, magnetic and electromagnetic type tools, it is foreseen for it to be able to mount a gripper tool 400 on the gripping heads 30, 40.

In particular, the gripper tool 400 can be advantageously used for the removal of cut pieces and/or "skeleton" portions by carrying out an extraction in the lateral direction, i.e., a movement substantially parallel to the horizontal plane.

Figure 8:
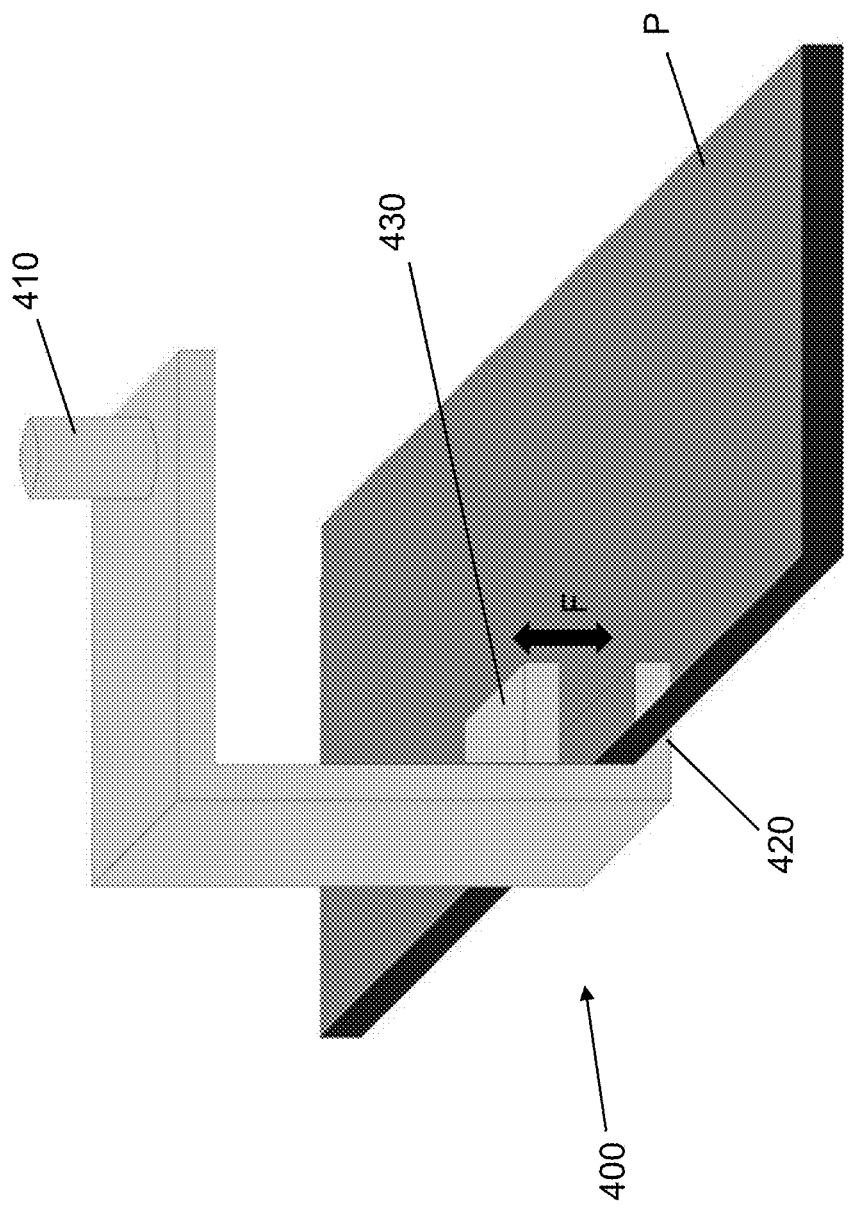
FIG. 8 shows a schematic perspective view of an end tool able to be associated with the device in accordance with the invention.

For this purpose, the gripper tool 400 (FIG. 8) comprises a fastening portion 410, to be engaged with the wrist of the robot (which will be described better hereinafter), a fixed finger 420 and a movable finger 430. The fixed finger 420 is substantially fixedly connected to the structure of the gripper tool 400; the movable finger 430, on the other hand, is movable towards/away from the fixed finger 420 (arrow F) and makes it possible to grip the piece P to be moved.

It is advantageously foreseen, before carrying out a lateral extraction, for the slab material to be cut in a suitable manner, not only to obtain the foreseen pieces, but also to allow the different skeleton portions to be removed.

Figure 6:
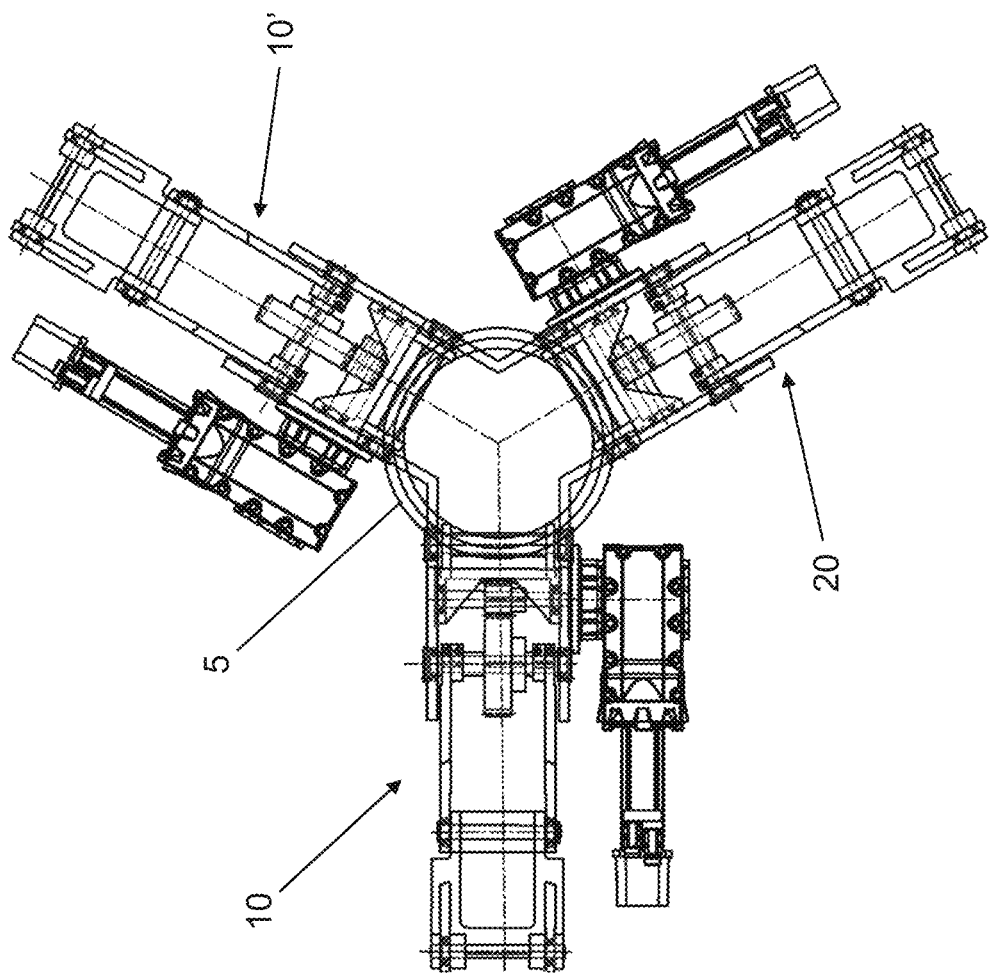
FIGS. 6-7 show plan views of a second and a third embodiment of the device in accordance with the present finding.
Figure 7:
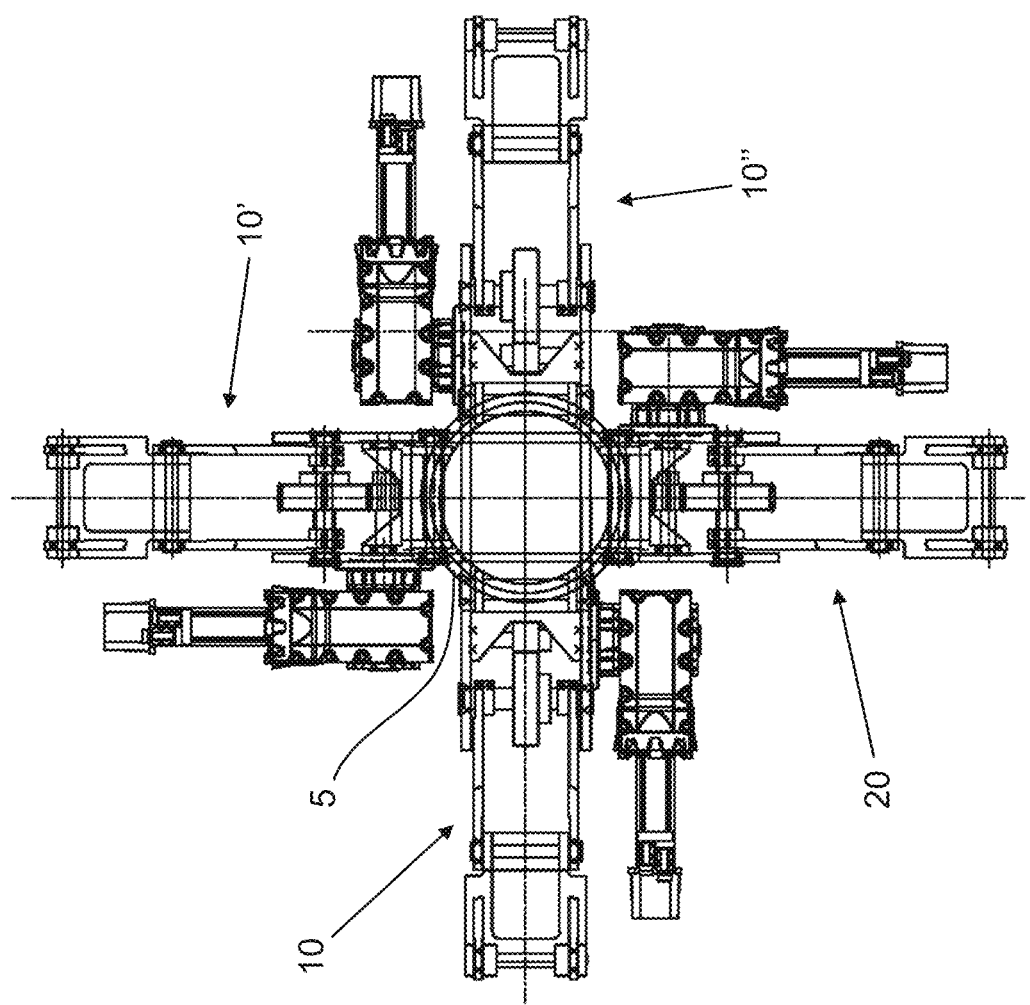

It should be noted that in the present description specific reference has been made to the first and the second articulated structure 10, 20. However, it is foreseen for the device 1 to be able to also be equipped with a third articulated structure 10' (FIG. 6) and with a fourth articulated structure 10" (FIG. 7). The third and the fourth articulated structures 10', 10" have totally analogous structure and operation as those of the first and/or second articulated structure 10, 20.

Each articulated structure 10, 20 comprises a first arm 100, 200, a second arm 110, 210 and a rod 120, 220.

The first arm 100, 200 is hinged to the main body 2 at a first end 100a, 200a of the first arm 100, 200 itself.

The second arm 110, 210 is hinged to the main body 2 at a first end 110a, 210a of the second arm 110, 210 itself.

Preferably, the first and second arm 100, 110 of the first articulated structure 100 are hinged to a portion of the main body 2 substantially fixedly connected to the portion of main body 2 to which the first and the second arm 200, 210 of the second articulated structure 20 are hinged.

The rod 120, 220 is hinged to the first and to the second arm 100, 200; 110, 210.

In particular, a first end 120a, 220a of the rod 120, 220 is hinged to a second end 100b, 200b of the first arm 100, 200. A second end 120b, 220b of the rod 120, 220 is hinged to a second end 110b, 210b of the second arm 110, 210.

Preferably, the first arm 100, 200 is the same axial length as the second arm 110, 210.

Preferably, the distance between the first and the second end 120a, 220a; 120b, 220b of the rod 120, 220 is substantially equal to the distance between the first end 100a, 200a of the first arm 100, 200 and the first end 110a, 210a of the second arm 110, 210.

In practice, each articulated structure 10, 20 forms an articulated parallelogram, formed from the first arm 100, 200, from the second arm 110, 210, from the rod 120, 220 and from the portion of main body 2 to which the first and second arm 100, 200; 110, 210 are hinged.

This makes it possible to translate the first and the second gripping head 30, 40 so as to modify the distance apart, as well as the respective heights/levels.

In order to move the first and the second gripping head 30, 40 the device 1 comprises a first and a second motorised member 50, 60.

The first motorised member 50 is mounted on the main body 2 and is active on the first articulated structure 10 to modify the position of the first gripping head 30 with respect to the main body 2 itself.

In greater detail, the first motorised member 50 can have an output shaft that, through a suitable reducer, acts on the first end 100a of the first arm 100, so as to impose a controlled rotation. In this way the first articulated structure 10 deforms, given that the first arm 100 pulls the rod 120 and the second arm 110, and the first gripping head 30 undergoes a consequent movement.

Similarly, the second motorised member 60 is mounted on the main body 2 and is active on the second articulated structure 20 to modify the position of the second gripping head 40 with respect to the main body 2.

In greater detail, the second motorised member 60 can have an output shaft that, through a suitable reducer, acts on the first end 200a of the first arm 200, so as to impose a controlled rotation. In this way the second articulated structure 20 deforms, given that the first arm 200 pulls the rod 220 and the second arm 210, and the second gripping head 40 undergoes a consequent movement.

The first and/or the second motorised member 50, 60 can be made, for example, as brushless motors.

Preferably, the first motorised member 50 is operable to move the first gripping head 30 along a substantially circumferential trajectory. Such substantially circumferential trajectory preferably lies on a plane that is substantially parallel to the weight force acting on the first gripping head 30. In practical terms, the substantially circumferential trajectory of the first gripping head 30 lies on a substantially vertical plane, i.e., a plane that is substantially orthogonal to the ground.

Preferably, the radius of the substantially circumferential trajectory of the first gripping head 30 is defined by the second arm 110; in particular, the radius of the substantially circumferential trajectory of the first gripping head 30 is substantially equal to the length of the second arm 110.

Preferably, the second motorised member 60 is operable to move the second gripping head 40 along a substantially circumferential trajectory. Such substantially circumferential trajectory preferably lies on a plane that is substantially parallel to the weight force acting on the second gripping head 40. In practical terms, the substantially circumferential trajectory of the second gripping head 40 lies on a substantially vertical plane, i.e., a plane that is substantially orthogonal to the ground.

Preferably, the radius of the substantially circumferential trajectory of the second gripping head 40 is defined by the second arm 210; in particular, the radius of the substantially circumferential trajectory of the second gripping head 40 is substantially equal to the length of the second arm 210.

Preferably, the substantially circumferential trajectories of the first and second gripping heads 30, 40 substantially lie on the same plane.

Preferably, each of the first arm 100, 200, the second arm 110, 210 and the rod 120, 220 is made with a pair of parallel elongated plates, fixed together and kept apart through suitable cross members.

Preferably, the gripping head 30, 40 is mounted at the second end 110b, 210b of the second arm 110, 210, i.e., where the second arm 100, 210 is hinged to the second end 120b, 220b of the rod 120, 220.

Preferably the first gripping head 30 is hinged to the second end 110b of the second arm 110.

Preferably, the second gripping head 40 is hinged to the second end 210b of the second arm 210.

Advantageously, the gripping head 30, 40 comprises an engagement plate 31, 41 that, thanks to the mounting on the articulated structure 10, 20 and to the type of movement imposed by the articulated structure 10, 20 itself, always faces downwards, i.e., facing the pieces to be loaded/unloaded.

Preferably, the main body 2 comprises an engagement portion 5, for example made as a bush or a flange, which allows the constraint with the moving structure 320 that will be described better hereinafter.

As stated, the gripping device 1 is advantageously used in apparatuses for loading/unloading slab materials, for example metallic materials, slaved to automatic cutting stations.

Figure 3:
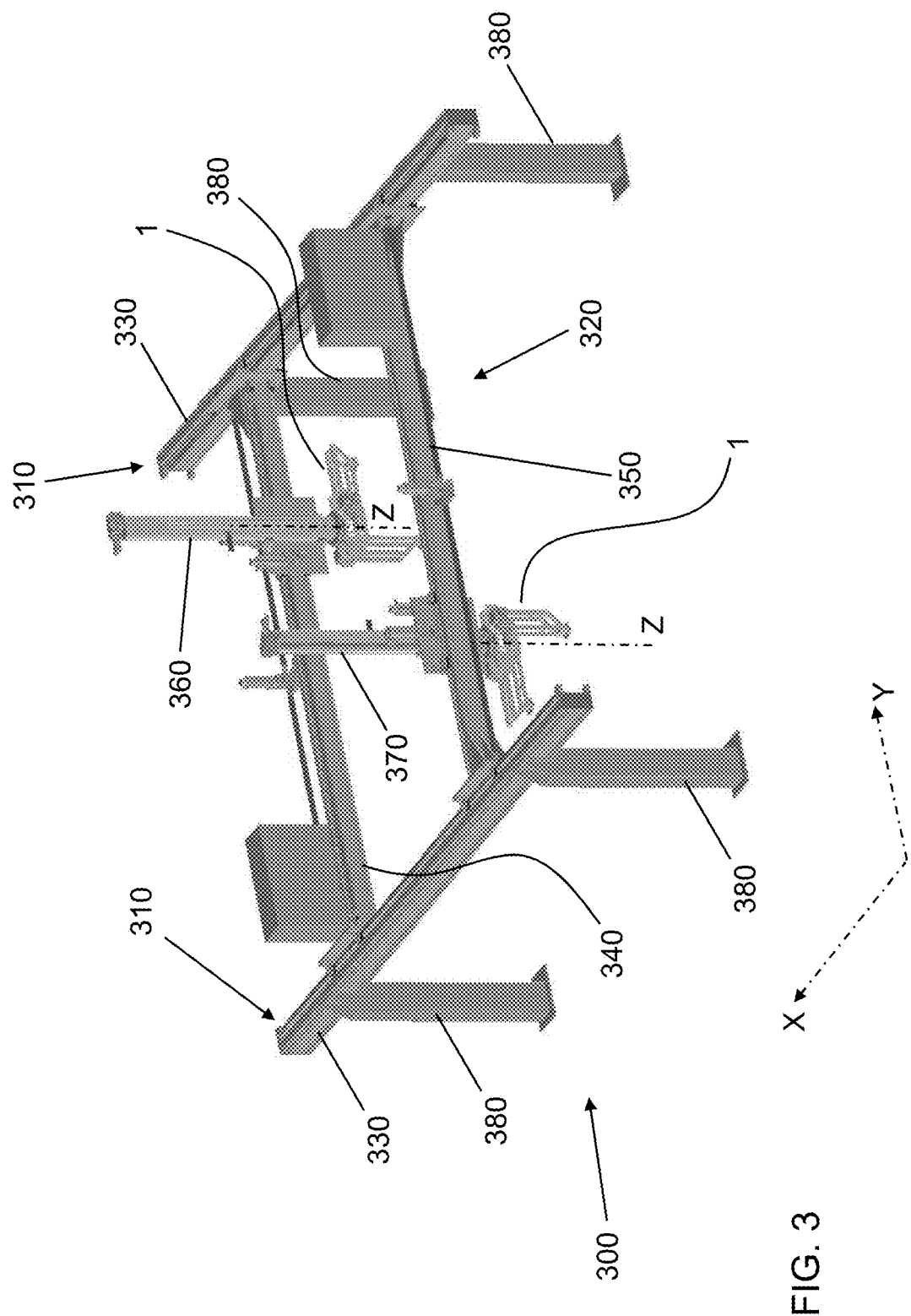
FIG. 3 shows a perspective view of an apparatus according to the present invention, wherein some parts have been eliminated to better highlight others.
Figure 4:
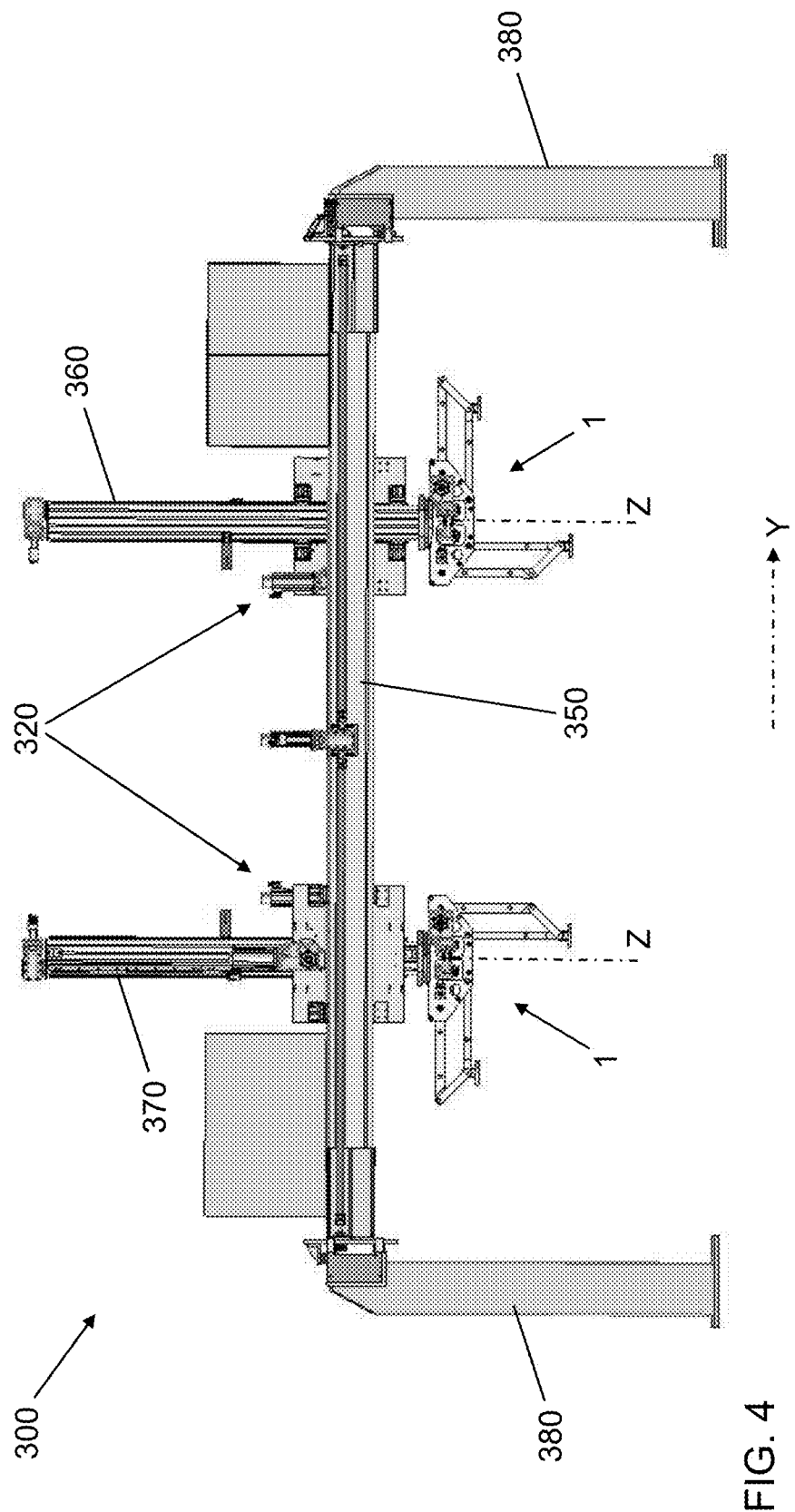
FIG. 4 shows a front view of the apparatus of FIG. 3.
Figure 5:
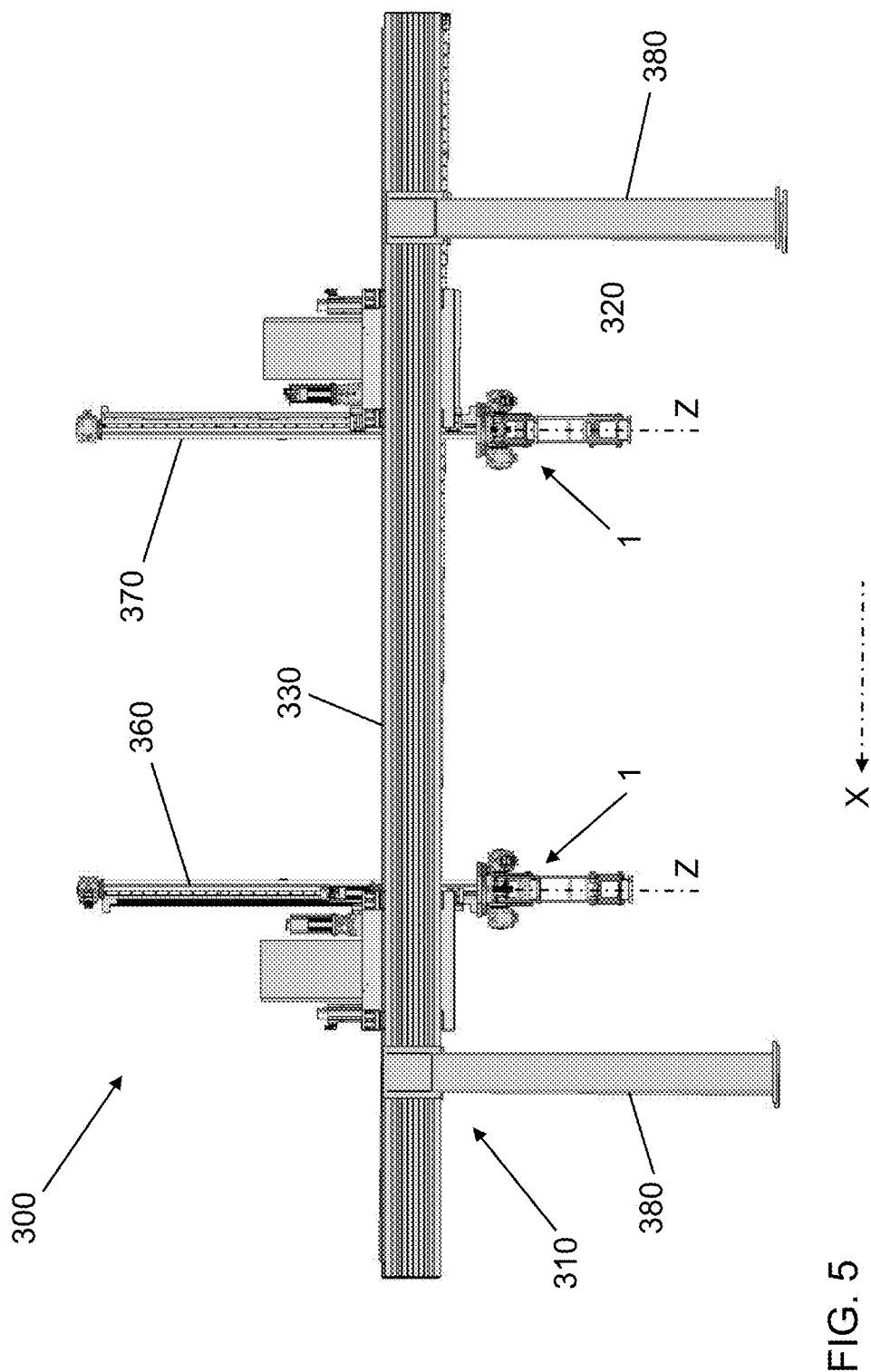
FIG. 5 shows a side view of the apparatus of FIG. 3.

An apparatus 300 of this type is schematically shown in FIGS. 3-5.

The apparatus 300 substantially comprises a support structure 310 and one or more gripping devices 1 of the type described above, supported by such a support structure 310.

As already stated, the apparatus 300 also comprises a moving structure 320, adapted for moving the gripping devices 1.

In an embodiment, the support structure 310 and the moving structure 320 can be made as a robot of the SCARA (Selective Compliance Assembly Robot Arm) type or an anthropomorphic robot, for example with 5 or 6 degrees of freedom.

Such a robot can be fixed to the ground, or it can be movable on suitable guides (e.g., rails) arranged on the ground, slaved to an actuator or other motorised mechanism.

Figure 10:
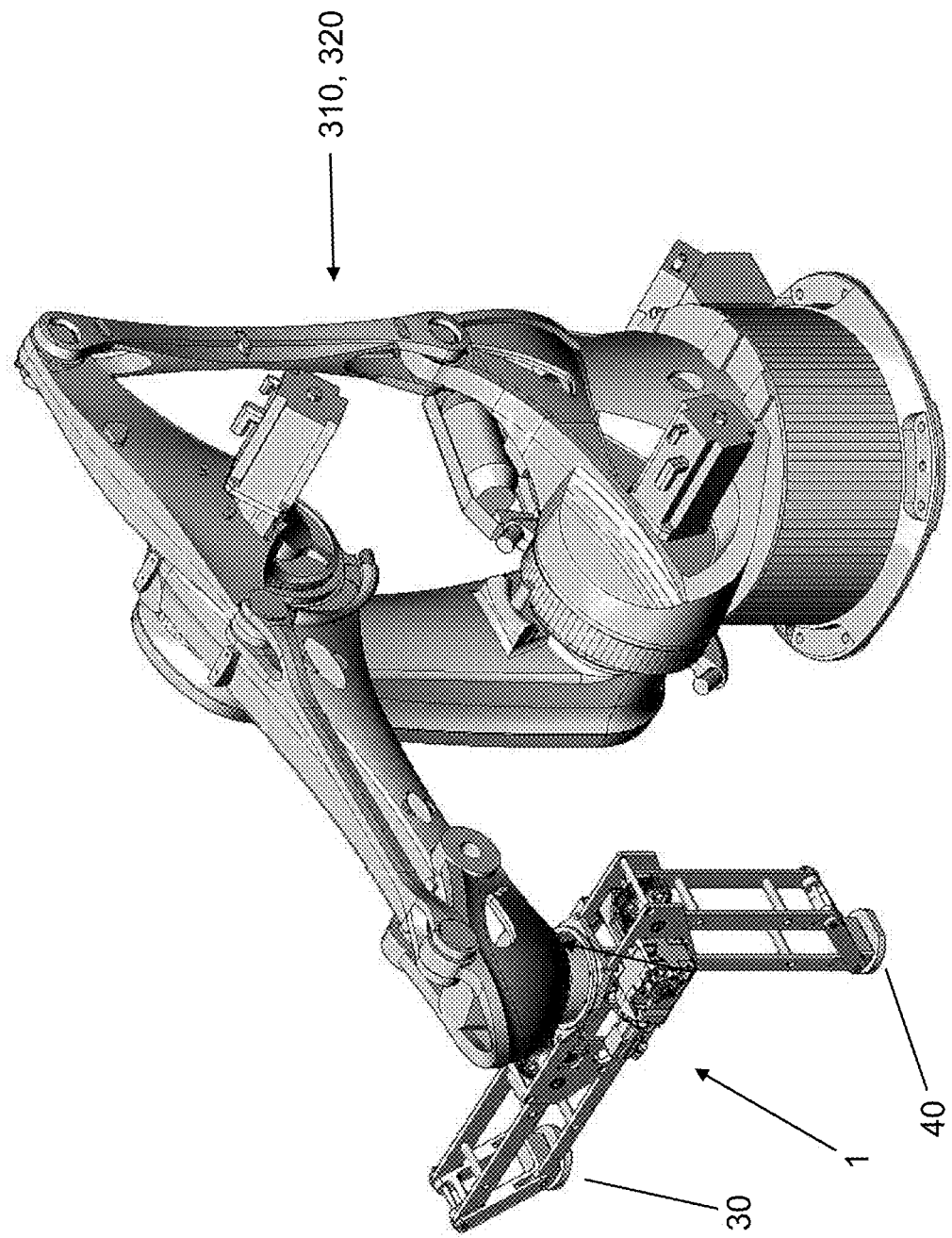
FIG. 10 shows the device of FIG. 1 mounted on a robot.

FIG. 10 schematically shows a gripping device 1 mounted on a robot 310, 320. The latter performs both the function of supporting, and the function of moving the gripping device 1.

Figure 9:
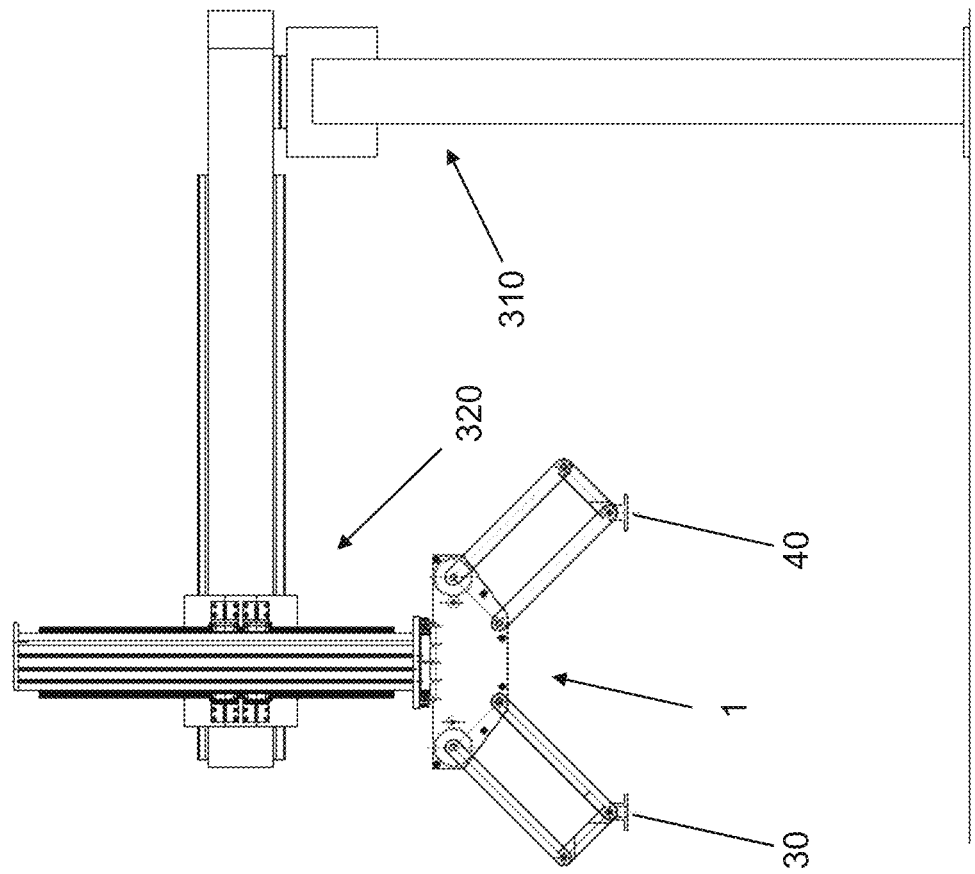
FIG. 9 shows the device of FIG. 1 mounted on a jib crane.

In another embodiment, the support structure 310 and the moving structure 320 can be made as one or more jib cranes (FIG. 9). In the case of two or more jib cranes, the latter can slide for example on a single rail. The latter can be mounted on the ground.

In a different embodiment, illustrated in FIGS. 3-5, the support structure 310 can comprise a pair of rails 330, supported by suitable uprights 380 or equivalent structural elements.

The area beneath the rails 330 substantially defines the operative space of the apparatus 300, i.e., the region of space in which the apparatus 300, thanks to the gripping devices 1, is capable of loading/unloading slabs or portions of slabs.

Thanks to the moving structure 320 the gripping devices 1 can move inside such a region.

Preferably, the moving structure 320 comprises one or more gantry cranes 340, 350. Each gantry crane 340, 350 is adapted for supporting at least a respective gripping device 1.

In FIGS. 3-5 each gantry crane 340, 350 supports a respective gripping device 1. However, it is foreseen for each gantry crane 340, 350 to also be able to support two or more gripping devices.

In an embodiment, the apparatus 300 comprises a single gripping device 1, and thus a single gantry crane adapted for supporting it. In a different embodiment, shown schematically in FIGS. 3-5, the apparatus 300 comprises two gripping devices 1, each supported by a respective gantry crane 340, 350.

The gantry cranes 340, 350 slide along the rails 300, actuated by suitable actuators, for example made as electric motors.

Each gantry crane 340, 350 supports a respective column 360, 370 to which the gripping device 1 is constrained. In particular the gripping device 1 is mounted at a lower end of the respective column 360, 370.

Such a column 360, 370 is movable along the respective gantry crane 340, 350.

The column 360, 370 can be associated with suitable actuators so as to cause a movement in the vertical direction (axis Z) and in rotation about the axis Z of the respective gripping device 1.

The horizontal plane X-Y is the one defined by the planar extension of the slabs to be moved.

Preferably, the gantry cranes 340, 350 move along the direction X.

Preferably, the gantry cranes 340, 350 extend along the direction Y, and the columns 360, 370 are moved along such a direction Y.

In light of the above, thanks to the use of one or more gripping devices 1 it is possible to carry out the following operations:

Picking up and depositing a piece with a gripping head: since the first and the second articulated structure 10, 20 are independent from one another, it is possible to pick up and deposit a piece through a single gripping head, for example the first gripping head 30, withdrawing the second gripping head 40, as shown in FIG. 2;

Picking up and depositing a piece with two gripping heads: thanks to the adjustment of the distance between the two gripping heads and the rotation by 360° about its own vertical axis, the gripping device 1, mounted on a gantry crane or on a robot, can pick up and deposit a piece, according to any orientation, constraining it through the tools mounted at the first and the second gripping head 30, 40;

Picking up and depositing two pieces, each with a gripping head: the device 1 can pick up one piece with the first gripping head 30, and one piece with the second gripping head 40, at two different times or simultaneously, and deposit them on two piles of pieces, lifting the gripping heads in an alternate manner;

Picking up and depositing a piece with many gripping heads: the following possibilities are foreseen:
  i. the piece is picked up through a gripping head of a first gripping device and a gripping head of a second gripping device; in other words, two gripping devices operate simultaneously on one same piece, each with a gripping head;
  ii. the piece is picked up through two gripping heads of a first gripping device and a third gripping head of a second gripping device; in other words, two gripping devices operate simultaneously on one same piece, the first with two gripping heads, the second with a single gripping head;

iii. the piece is picked up through two gripping heads of a first gripping device and two gripping heads of a second gripping device; in other words, two gripping devices operate simultaneously on one same piece, each with two gripping heads;

Picking up and depositing two pieces with two gripping devices, in which each piece is picked up through a gripping head of a device and a gripping head of the other device; the depositing of the pieces preferably takes place at two different times, but in certain cases also simultaneously, lifting the gripping heads alternately;

the gripping device rotates the pieces from 0° to 360°: thanks to its configuration and to the way in which it is supported, the gripping device 1 can pick up horizontal, vertical and inclined pieces and rotate them in the depositing operation, to exploit the space on the pallets in the most suitable way;

Two gripping devices rotate a piece from −90° to +90°: two gripping devices, which pick up the same piece simultaneously with 2, 3 or 4 gripping heads, can rotate the pieces from −90° to +90° (180° in total), to deposit them on the pallets in an optimised manner;

Slab loading: two gripping devices used simultaneously pick up and load the fresh slabs on the feeding bench or table of the cutting machine;

Unloading of the slab waste skeleton: the gripping devices, equipped with a tool shaped like a rake, pick up and unload the slab waste skeleton, possibly cut in pieces.

It should be noted that, in addition to the above, it is foreseen for it to be possible to mount a marking tool or a labeller on one or more gripping heads. In this way, the marking of the codes of the pieces can be carried out.

The invention achieves important advantages.

Firstly, the invention makes it possible to adapt the shape/configuration of the gripping device as a function of the single operations to be carried out, avoiding frequent tool changes and thus reducing the cycle time and costs of the tools.

The fact that it is possible to adapt the shape/configuration of the gripping device also allows the pieces to be picked up more safely. Indeed, the adaptation to the shape of the pieces makes it possible to rest only on the piece, stopping the deformation or overturning of surrounding pieces and skeleton from preventing the operation. For example, a fixed rectangular tool, larger than the piece to be picked up, does not ensure gripping if a nearby piece is inclined or if the skeleton of the slab is deformed, since it cannot rest properly on the piece, touching surrounding pieces or slab skeleton.

Thanks to the invention, the nesting of the pieces on the pallets is also optimised. Indeed, the adaptation to the shape of the pieces allows the gripping device, in the depositing step, to insert between the piles of pieces already unloaded. In conventional systems, a fixed tool larger than the piece picked up cannot obtain good nesting on the pallets, having to consider the maximum bulk of the gripping tool and not that of the piece.

The nesting of the pieces on the pallets is further improved by the fact that the gripping device according to the invention can be rotated substantially by 360° about its own vertical axis. This type of advantage is also obtained when the pieces are cut in oblique position. Indeed, as described above, the device object of the invention is equipped with two gripping heads; thanks to the possibility of rotation by 360° of the device itself, the heads can be oriented substantially according to any direction. A single device thus has the ability to pick up pieces cut obliquely, and to move them with great freedom. Differently, the apparatuses of the prior art often have the possibility of picking up pieces cut obliquely only using gripping heads belonging to different portals, with consequent limitations for the subsequent movements aimed at nesting.

When suitably programmed, the apparatus in accordance with the present invention can carry out many operations that are simultaneous or grouped in succession, thus improving the cycle times. Through operations for picking up many pieces simultaneously or in succession, one piece for each arm based on their size, and subsequently operations for depositing on the pallets or crates simultaneously or grouped in succession, the system reduces the movement journeys and thus the work cycle.

In addition to the above, the embodiment equipped with two gripping devices mounted on gantry cranes having Cartesian axes allows both the loading of fresh slabs and the unloading of large-sized pieces of any shape. This characteristic allows the use of the robotised gripping hands even for slabs of large thicknesses and dimensions, specifically for plasma cutting and oxycutting, where there are still few effective solutions.

In particular, a very useful characteristic is the possibility of performing a +/−90° rotation of a horizontal piece picked up with two or four arms on two different portals.

Also in the case in which two or more gripping devices are mounted on two or more jib cranes, it is possible to load fresh slabs and unload large-sized pieces of substantially any shape.

The invention claimed is:

1. A gripping device for loading/unloading apparatuses, comprising:
   a) a main body;
   b) at least one first and a second articulated structure;
   c) at least one first and a second gripping head, respectively mounted on said first and second articulated structure, each of said first and second gripping head being equipped with a magnetic, electromagnetic or suction cup gripping tool;
   d) a first motorised member, mounted on said main body and active on said first articulated structure to modify the position of said first gripping head with respect to said main body, said first motorized member having a first output shaft on which a first toothed wheel is fitted;
   e) a second motorised member, mounted on said main body and active on said second articulated structure to modify the position of said second gripping head with respect to said main body, said second motorized member having a second output shaft on which a second toothed wheel is fitted;
   wherein each of said first and second articulated structures has:
   a first arm hinged to said main body;
   a second arm hinged to said main body;
   a rod, hinged to said first arm and to said second arm
      wherein said first motorized member is operable to move said first gripping head along a substantially circumferential trajectory, the radius of which is defined by the second arm of said first articulated structure;

wherein the substantially circumferential trajectory of said first gripping head lies on a plane substantially parallel to a weight force acting on said first gripping head;

wherein said second motorized member is operable to move said second gripping head along a substantially circumferential trajectory, the radius of which is defined by the second arm of said second articulated structure;

wherein the substantially circumferential trajectory of said second gripping head lies on a plane substantially parallel to a weight force acting on said second gripping head;

wherein the first arm of said first articulated structure is coupled to a third toothed wheel, the latter being engaged with said first toothed wheel;

wherein the first arm of said second articulated structure is coupled to a fourth toothed wheel, the latter being engaged with said second toothed wheel;

wherein, in each of said first and second articulated structure, the first arm is hinged to said main body at a first end of said first arm, and the second arm is hinged to said main body at a first end of said second arm;

wherein, in each of said first and second articulated structure, a segment joining the first end of the first arm and the first end of the second arm is inclined with respect to both:
the direction of the weight force acting on said first and second gripping head, and
a plane orthogonal to said weight force wherein each of said first and second gripping head comprises an engagement plate having a planar extension which, upon movement of the first and second articulated structure, remains orthogonal to said weight force.

2. The device according to claim 1, wherein, in each of said first and second articulated structures, said rod is hinged to said first arm at a first end of said rod.

3. The device according to claim 1, wherein, in each of said first and second articulated structures, said rod is hinged to a second end of said first arm.

4. The device according to claim 1, wherein, in each of said first and second articulated structures, said rod is hinged to said second arm at a second end of said rod.

5. The device according to claim 1, wherein, in each of said first and second articulated structures, said rod is hinged to a second end of said second arm.

6. The device according to claim 1, wherein, in each of said first and second articulated structures, said first arm and said second arm are substantially the same axial length.

7. The device according to claim 1, wherein, in each of said first and second articulated structures, a distance between a first and a second end of said rod is substantially equal to a distance between a first end of the first arm and a first end of the second arm.

8. The device according to claim 1, wherein said first gripping head is hinged to a second end of the second arm of said first articulated structure, and said second gripping head is hinged to a second end of the second arm of said second articulated structure.

9. The device according to claim 1, wherein said main body further comprises an engagement portion for a constraint to a moving structure of an apparatus for loading/unloading slab materials.

10. An apparatus for loading/unloading slab materials, comprising;
a) a support structure;
b) one or more gripping devices according to claim 1, mounted on said support structure;
c) a moving structure, to move said one or more gripping devices with respect to said support structure.

11. The apparatus according to claim 10, wherein said support structure comprises a pair of rails and one or more gantry cranes movable in translation on said rails, each of said one or more gripping devices being supported by a respective gantry crane.

12. The apparatus according to claim 10, wherein said moving structure is configured to cause vertical movements towards/away from a slab material to be loaded/unloaded, and movements in rotation about a vertical axis of said one or more gripping devices.

* * * * *